United States Patent [19]

Gill et al.

[11] 4,185,517

[45] Jan. 29, 1980

[54] CONTROL DEVICES

[75] Inventors: John G. Gill, Chignal St. James, Nr. Chelmsford; James F. Hemens, Billericay, both of England

[73] Assignee: Teleflex Morse Limited, Basildon, England

[21] Appl. No.: 761,200

[22] Filed: Jan. 21, 1977

[30] Foreign Application Priority Data

Jan. 23, 1976 [GB] United Kingdom ............... 2681/76
Mar. 23, 1976 [GB] United Kingdom ............. 11699/76

[51] Int. Cl.² ............................................. G05G 1/14
[52] U.S. Cl. ........................................ 74/512; 74/513
[58] Field of Search .................. 74/512, 513, 514, 562, 74/478, 481, 482

[56] References Cited

U.S. PATENT DOCUMENTS

| | | | |
|---|---|---|---|
| 1,157,140 | 10/1915 | Anderson | 74/562 |
| 1,255,220 | 2/1918 | Petry | 74/512 |
| 1,396,965 | 11/1921 | Lucand | 74/512 X |
| 1,414,907 | 5/1922 | Vogt | 74/512 |
| 1,495,063 | 5/1924 | Bailhe | 74/513 |
| 1,766,877 | 6/1930 | Butterick | 74/513 |
| 2,401,716 | 6/1946 | Williams | 74/512 |
| 2,424,523 | 7/1947 | Watter | 74/512 X |
| 2,532,189 | 11/1950 | Pinardi et al. | 74/513 |
| 2,779,209 | 1/1957 | Estes et al. | 74/512 |
| 3,316,773 | 5/1967 | Findlay | 74/512 X |
| 3,371,641 | 3/1968 | Rohman et al. | 74/512 X |
| 3,394,614 | 7/1968 | Zeidler | 74/512 X |
| 3,861,237 | 1/1975 | Mounts | 74/512 X |
| 3,910,133 | 10/1975 | Oestmann | 74/512 X |
| 3,939,726 | 2/1976 | Ahrens | 74/513 |
| 4,043,217 | 8/1977 | Kleist | 74/512 X |

FOREIGN PATENT DOCUMENTS

| | | | |
|---|---|---|---|
| 642853 | 9/1950 | United Kingdom | 74/513 |
| 1388900 | 3/1975 | United Kingdom | 74/512 |

*Primary Examiner*—Samuel Scott
*Assistant Examiner*—Randall L. Green
*Attorney, Agent, or Firm*—James C. Wray

[57] ABSTRACT

The invention comprehends a pedal operated mechanism comprising a pedal, means for mounting the pedal for pivotal movement about a substantially horizontal axis (considered in one orientation of said mechanism) in a substantially vertical plane, an output means adapted for operative connection to a flexible cable element, connection means operatively connecting the output means and the pedal such that the output means will translate the cable element, when operatively connected thereto, in response to pivotal movement of the pedal, and adjusting means for swivelling the output means relative to the pedal about a substantially vertical axis into any of a plurality of angular positions in a horizontal plane such that the cable element can extend in any path complementary to the angular position in which the output means is adjusted, the connection means maintaining said operative connection between the pedal and the output means in whatever angular position the output means is adjusted.

30 Claims, 11 Drawing Figures

CONTROL DEVICES

This invention relates to control devices and, in particular, pedal operated mechanisms for imparting control to a member remote therefrom and over which control is to be exerted by manual pressure applied to the pedal.

Pedal operated mechanisms when used, say, for heavy operator's plant such as 'on highway' vehicles like trucks or 'off highway' equipment, for example, cranes, excavating machinery, earth moving equipment, concrete mixers and heavy fork trucks, have tended to be somewhat complex having regard to the diversity of equipment for which they are intended. Thus, when the engine throttle is to be the controlled member, it can be that the power unit, in dependence on the nature of the piece of equipment concerned, can be remote from the driver's position and be positioned at the front or the rear of the vehicle as well as in a mid-position. As a further complicating factor, the engine in relation to the control pedal could well not be in the same vertical plane but considerably offset horizontally. Furthermore, vehicles with right or left hand drive provide further problems. Yet again, the vertical height of the control pedal from the throttle could be very different having regard to the particular nature of the vehicle concerned.

For these reasons, standard pedal operated mechanisms utilized with a number of different vehicles have not, so far as is known to us, been developed in the past, but rather the art has seen the incorporation of "one-off" pedal control mechanisms adapted for the particular application. Moreover, when such mechanisms employ linkage rods between the pedal and the member to be controlled, somewhat complicated systems have resulted according to the relative positioning of those operator and operating components respectively.

Whilst the foregoing discussion has been confined when being specific to the control of engine throttles, the provision of a mechanical control from a pedal to the clutch involves similar problems.

We have developed a pedal operated construction which is more flexible in its application to any known to us previously.

According to the present invention there is provided a pedal operated mechanism comprising a pedal, means for mounting the pedal for pivotal movement about a substantially horizontal axis (considered in one orientation of said mechanism) in a substantially vertical plane, an output means adapted for operative connection to a flexible cable element, connection means operatively connecting the output means and the pedal such that the output means will translate the cable element, when operatively connected thereto, in response to pivotal movement of the pedal, and adjusting means for swivelling the output means relative to the pedal about a substantially vertical axis into any of a plurality of angular positions in a horizontal plane such that the cable element can extend in any path complementary to the angular position in which the output means is adjusted, the connection means maintaining said operative connection between the pedal and the output means in whatever angular position the output means is adjusted.

In use of a preferred pedal operated mechanism constructed in accordance with the invention, with the pedal mounted for pivotal movement in a vertical plane, a mechanism connecting the pedal to a linearly movable control cable can be swivelled through 360° in a horizontal plane to position the control cable in any required angular attitude relative to the member to which it is to impart control motion. If the control cable is resiliently deformable and thus able to be flexed in a vertical plane, the entire arrangement cannot only accommodate for horizontal 'misalignment' between the pedal and the member it is to control but also cater for differing vertical spacings therebetween. To enhance the latter characteristic, it is envisaged that the mechanism would provide for attachment of the control cable at a number of different attitudes of vertical "attack" thereto.

In order that the invention may be well understood, there will now be described some embodiments thereof, given by way of example only, reference being had to the accompanying drawings, in which.

In the various Figures, like parts are denoted by like reference numerals.

Referring first to the pedal mechanism of FIGS. 1 to 4, a pedal 1, dished to allow the insertion of a foot thereinto, has a depending flange 2 integral therewith through which passes a pin 3 which attaches the pedal to a hollow post 4 for pivotal motion in a vertical plane about the horizontal longitudinal axis 5 of the pivot pin. A pair of bushes 6, as of nylon, bearingly receive the pivot pin 3 and are themselves housed in a bore in the post 4, and the pin is held in position in the flange 2 by means of a radial peg 7 and against withdrawal from the post by a circlip 8.

Forward of the pivot axis 5 of the pedal 1, a lug 9 is attached as by screws 10 to the underside of the pedal. A forked upper end 11 of an end fitting 12 is secured about a lower central flat region 13 of the lug 9 by a horizontal pivot pin 14, so that relative pivot movement can occur between the end fitting and the lug about the axis 14a of the pivot pin itself held in position as by circlips (not shown), and the lower end 15 of that end fitting is screwed on to a substantially vertical rod 16 which passes centrally through the hollow interior of the post 4. Intermediate of its ends, the post 4 has an integral collar 17 by which to be bolted at 18 to a mounting panel 19 of a vehicle fitted with the pedal operated mechanism. The rod 16 passes generally vertically downwardly within the post 4 and through a flexible dust seal 20 serving to prevent ingress of extraneous matter to the lower part of the mechanism (and the upper part thereof) now to be described.

Figure 4:
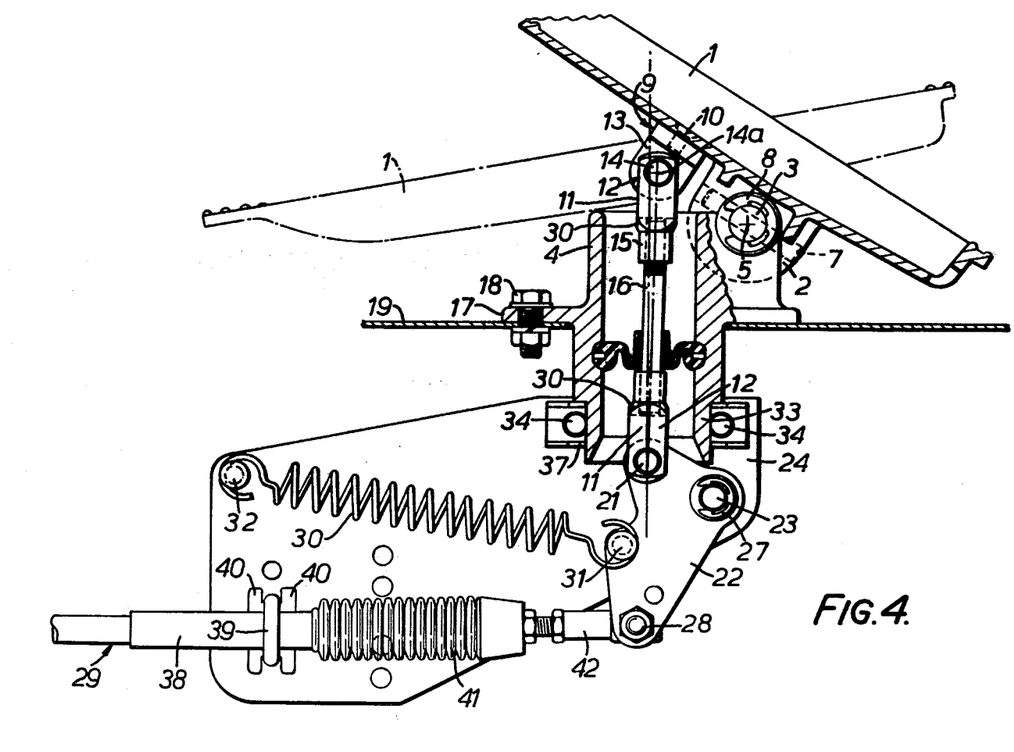
FIG. 4 is a section along line IV—IV of FIG. 3.
Figure 6:
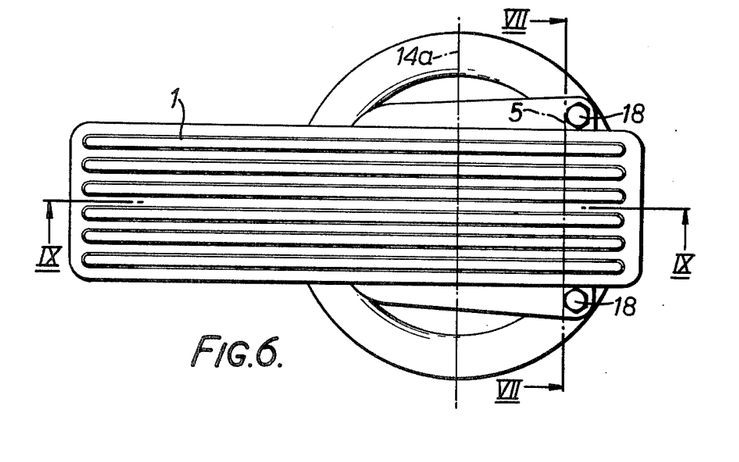
FIG. 6 is a plan view of a third pedal operated mechanism.

To the lower end of the rod 16 is screwed a second end fitting 12 shaped similarly to that first mentioned, the forked end 11 of which is attached by a horizontal pivot pin 21 to a bell crank lever 22. In turn, the lever 22 is connected for swinging movement in a vertical plane about a horizontal pivot post 23 suitably affixed to a plate 24 fast with respect to the vehicle, a pair of collars 25, 26 being mounted about the post 23 on opposite sides of the lever 22 with the outer collar 26 retained in position as by a circlip 27. The lower end of the bell crank lever 22 is affixed at 28 to a flexible control cable 29 whose remote end is attached to the member to be controlled of the vehicle, in this case the throttle control.

Each end fitting 12 is constructed of two pieces capable of pivotal movement relative to one another around an arcuate surface 30. The effect of this, in conjunction with the geometric arrangement described, is that when foot pressure is applied to the pedal 1 forwardly of the pivot axis 5 thereof, the rod 16 is urged downwardly to cause through the pivot pin 21 the bell crank lever 22 to swing anticlockwise about the pivot post 23 and so urge the core of the cable 29 (as will be explained) to translate and so effect a control movement over the throttle control.

Upon removal of the foot pressure applied to the pedal 1, the movable components of the pedal mechanism are returned to their original position by the bias applied by a return spring 30, one end of which is hooked around a pivot post 31 affixed to the bell crank lever 22 and the outer end of which is engaged about a pin 32 secured to the plate 24. Whilst convenient to have the spring so positioned, the mechanism could incorporate, instead, a return spring at, say, the control throttle itself to return the cable core and hence, through the bell crank lever 22, the pedal mechanism to the condition shown in full lines in FIG. 4.

Figure 1:
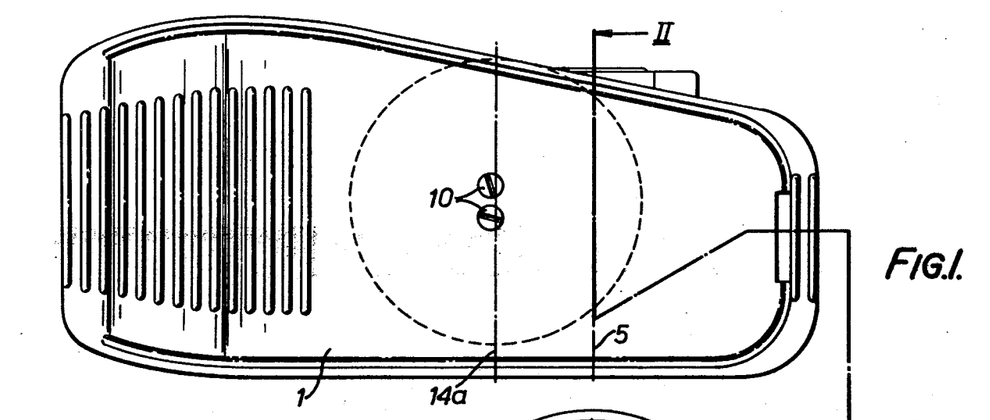
FIG. 1 is a plan view of a pedal operated mechanism.
Figures 2, 5:
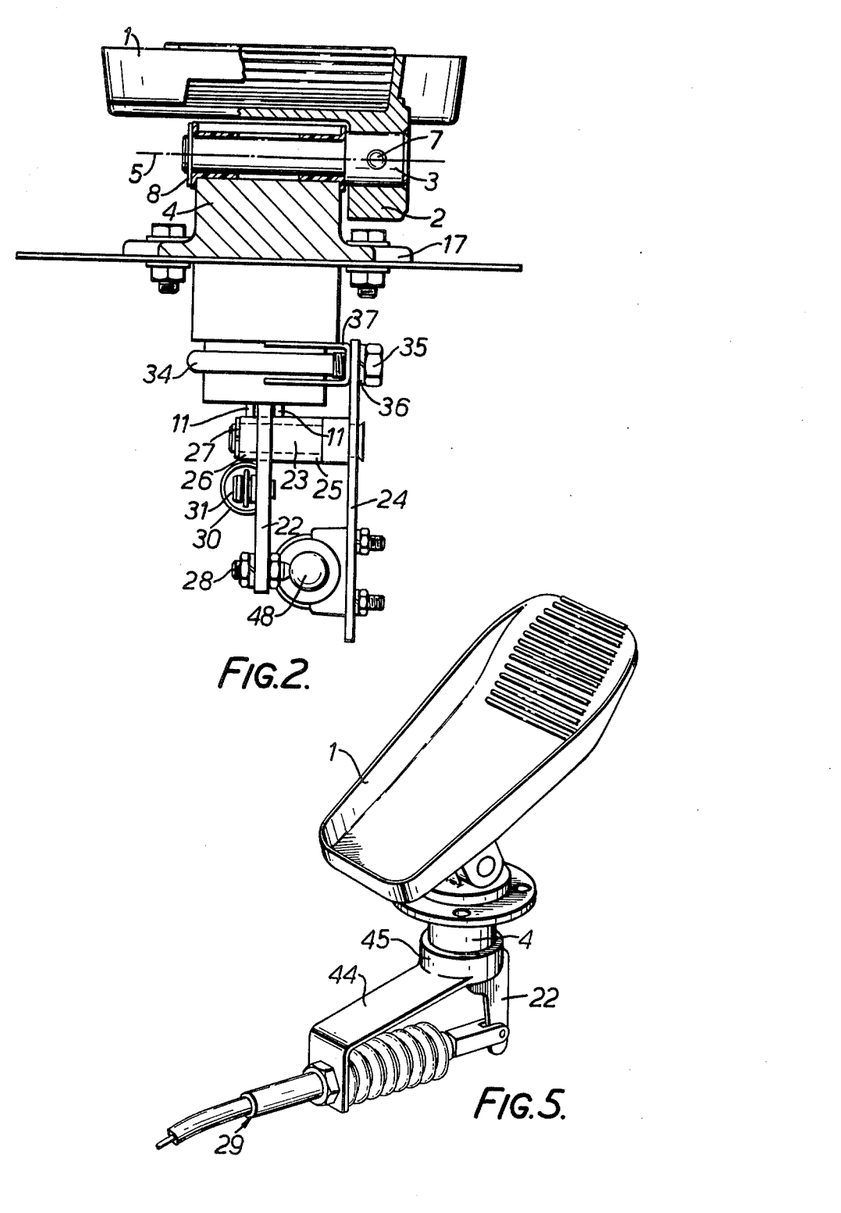
FIG. 2 is a section along line I—I of FIG. 1.
FIG. 5 is a pictorial view of an alternative pedal operated mechanism albeit constructed generally similarly in its "essential" features to that of the preceding Figures.
Figure 3:
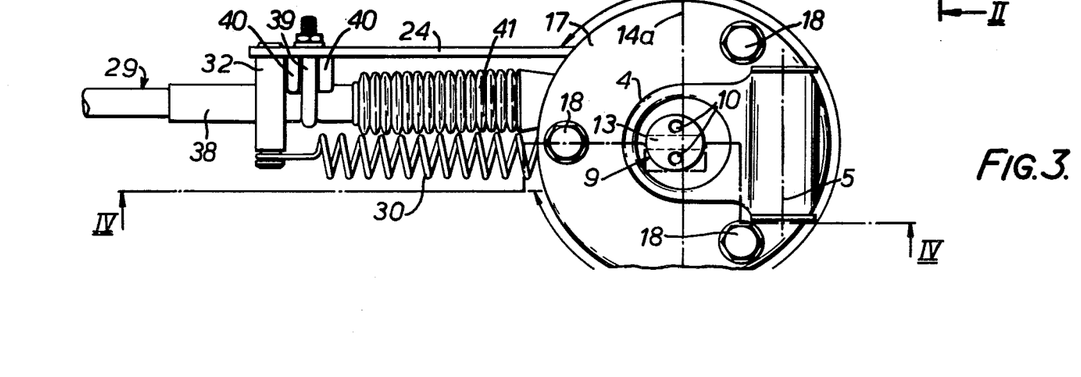
FIG. 3 is an underplan view of the same pedal operated mechanism but deficient of the pedal thereof.

As depicted, the pedal mechanism is mounted through the flange 17 on a horizontal surface being the mounting panel 19 with the hollow post 4 extending with the rod 16 vertically and with the cable 29 leading horizontally from the bell crank lever 22. Whilst the cable 29 is shown as extending in a leftward direction as viewed in FIG. 4 the construction is such that cable entry to the bell crank lever 22 can be afforded at any angle in the horizontal plane, as depicted in FIG. 3.

To that end, the lower end of the hollow post 4 in its reduced diameter region 33 is embraced by a U-bolt 34 the threaded ends of which pass through the plate 24 to be secured thereto by nuts 35 bearing on washers 36, a U-shaped cross section support part 37 being mounted on the ends of the U-bolt 34 to embrace the back half of the periphery of the hollow post 4. By releasing the nuts 35, the plate 24 together with all the components attached thereto can be swung with the U-bolt 34 about the vertical axis of the hollow post 4 without affecting the operation or the orientation of the pedal 1, the lower end fitting 12 merely being turned about the vertical rod 16. It is, essentially, the generally vertical alignment of the upper and lower pivots 14 and 21 respectively operatively associated with the pedal 1 and the bell crank lever 22 which make the infinite adjustment in the horizontal plane of those operative components of the pedal mechanism mounted below the mounting panel 19 possible, coupled, of course, with the concentricity of the post region 34, about which the adjusting swivel motion takes place, with the vertical rod 16.

The flexibility of the pedal mechanism will now be apparent. Whatever the spacing between the driver's position and, in a horizontal direction, whether longitudinally or laterally of the vehicle, the engine, the cable length can be chosen to suit and the plate 24 can be swung in a horizontal plane without affecting the pedal or the mechanism immediately connected thereto to align the cable with the throttle control. Moreover, the cable would preferably be flexible to permit a degree of vertical adjustment thereof.

The angular attitude of the pedal 1 can be adjusted as required by screwing either the top or bottom end fitting 12 along the vertical rod 16. Only one such end fitting need incorporate a screw thread mounting for this purpose.

The cable construction could be any suitable form as marketed by the Applicant company. In the present instance, since the cable is only to take a tensile loading it could be a pull-pull cable. Alternately, where the cable is to be subjected to a compression as well as a tensile force, it would be a push-pull cable. The latter could occur in the event of the pedal pivot being arranged so that a downward foot pressure applied to the forward end of the pedal urged the vertical rod downwardly and so effected a pull on the cable core to the throttle control and so that a downward foot pressure applied to the rearward end of the pedal caused the vertical rod to lift and so through another cable connected by a suitable lever means associated with the vertical rod (the pull-pull cable being rendered effectively inoperative upon such lift motion of the vertical rod) operate a control requiring a degree of compression in the cable. The arrangement described, as will be appreciated, envisages a dual control pedal arrangement.

In the present instance, as said, the pull-pull cable can take any standard form as marketed by us. Thus, as illustrated, the casing 38 of the cable 29 is clamped by a U-clamp 39 to the plate 24 within suitable guide members 40, and the core (not shown) extends through an elastomeric bellows seal 41 within which it is secured to a rod construction 42 connected via a ball joint arrangement 43 to the point of attachment 28 with the bell crank lever 22.

As will be realized, there is much in the described and illustrated embodiment which could be altered and yet which would still give the required degree of flexibility required of the pedal mechanism. Thus, referring now to FIG. 5 which shows but one alternative, whilst the essential character of the previous embodiment has been retained, the plate 24, in particular, takes a very different form and comprises an angled mounting bracket 44 incorporating an integral collar 45 which is mounted about the lower end of the hollow post 4 and which would be affixed in any desired angular position relative thereto by any suitable means (not shown).

As another alternative, the hollow post might not be circular but polygonal to give a definite rather than an infinite number of angular adjustments.

Yet again, the vehicle might incorporate a suitable plate or mounting bracket structure which could be adapted to accept the pedal mechanism.

Referring now to FIGS. 6 to 9, only the principal constructional differences between that further alternative pedal operated mechanism and those of the previous embodiments will be discussed.

Figure 9:
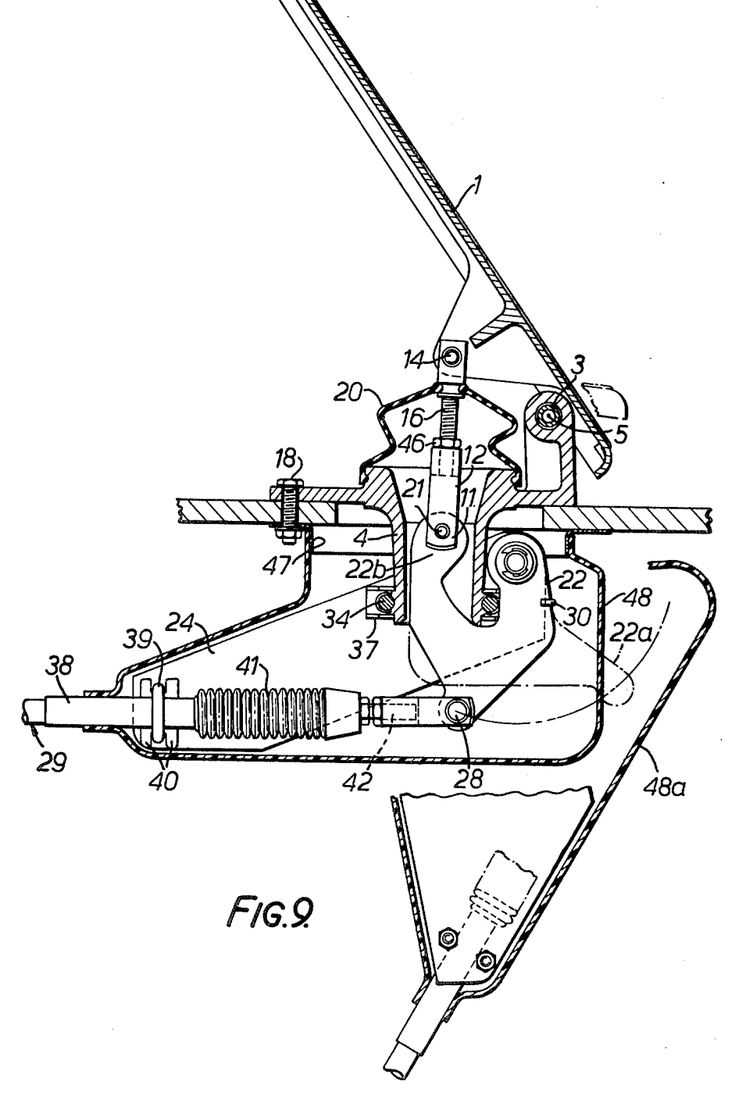
FIG. 9 is a section along line IX—IX of FIG. 6.

Thus, the bell crank lever 22 can take the form of that shown in unbroken outline, by which the control cable 29 would normally be in a horizontal attitude, or, alternatively, be, as indicated, in dashed outline 22a, by which to give an optional 60° entry of the cable as measured from the horizontal in FIG. 9. Thereby, the mechanism can accept two different bell crank levers, as indicated.

Whether the one, or the other, bell crank lever is adopted, the left, as again viewed in FIG. 9, limb 22b thereof extends upwardly well into the hollow post 4 and is connected by a horizontal pivot pin 21 to the forked end 11 of an end fitting 12, there being but one such end fitting. The lower end of a rod 16 is screwed into that end fitting and held in its adjusted vertical position by a locknut 46. The upper end of the rod 16 is directly attached by a horizontal pivot pin 14 to the underside of a pedal 1. Moreover, a flexible dust seal 20 extends, not as in our previous embodiments within the hollow post 4, but rather upwardly thereof to the upper end of the rod 16 thereby to form a bellows-like seal at the top of the post 4.

Another constructional difference is the provision of a depending collar 47 secured at the bolting points 18 to the underside of a mounting panel 19, an elastomeric boot 48 or 48a (according to which bell crank lever is used) being fitted to that collar 47 and around the control cable 29 to seal off the working parts of the mechanism positioned below the mounting panel.

Figure 7:
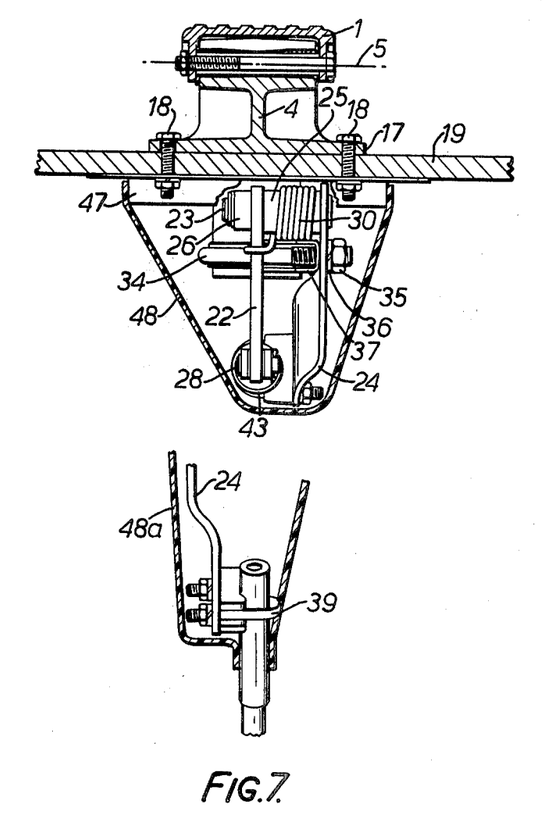
FIG. 7 is a section along line VII—VII of FIG. 6.
Figure 8:
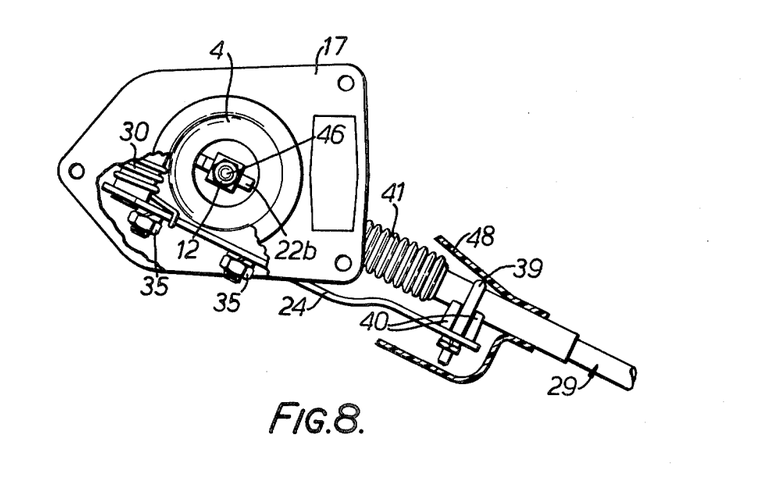
FIG. 8 is a part cut-away plan view with certain parts removed of the pedal operated mechanism of FIGS. 6 and 7.

A spring return direct to the bell crank lever 22 or 22a is provided, but a torsion spring 30, see FIG. 7, is wrapped around a collar 25 with one of its ends anchored to the bell crank lever and the other to a plate 24 which is fast with the vehicle.

Since the right, as viewed in FIG. 9, limb 22c of the bell crank lever extends upwardly of the components, U-bolt 34 etc., providing for infinite adjustment in a horizontal plane, as in the previous embodiments, of the operative parts of the mechanism below the mounting panel to accommodate for control cable entry in any horizontal attitude (as well as in the "60° attitude" mentioned hereinbefore), the aforesaid components are positioned below the pivot pin 23 (and the pivot pin 21) rather than above as previously.

Figures 10, 11:
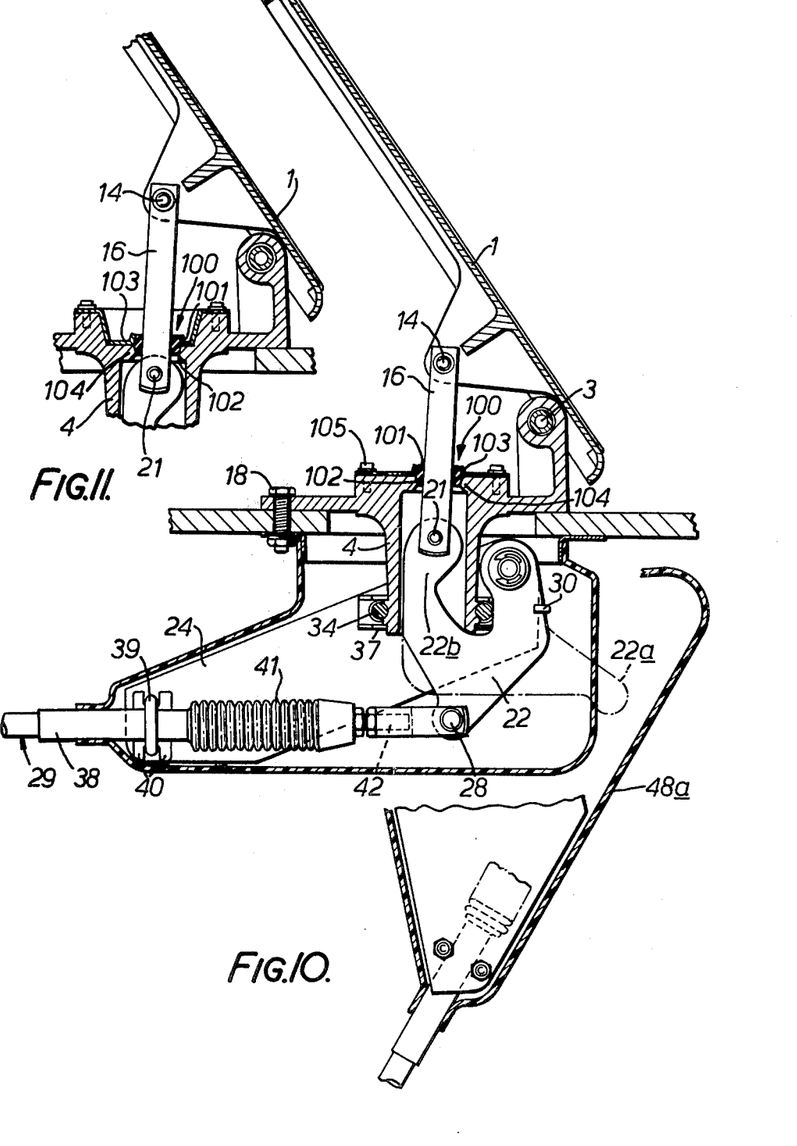
FIG. 10 is a view corresponding to FIG. 9, of a fourth pedal operated mechanism.
FIG. 11 is a scrap section corresponding to FIG. 10, of a fifth pedal operated mechanism.

We have also devised two further alternative pedal operated mechanisms which are depicted in FIGS. 10 and 11 respectively and which are generally similar to the embodiment just described, differing therefrom principally in the respects now to be discussed.

Thus, FIG. 10 (which corresponds to FIG. 9) is changed mainly in that a pivot bearing 100 is mounted intermediate the ends of the rod 16 so that the rod can pivot about that bearing as well as pivot at its opposite ends (which, whilst not shown, would be attached by one or both end fittings—providing for the swivel adjustment of the bell crank lever relative to the pedal—to the bell crank lever and foot pedal respectively) as previously. By this construction, it will be the swinging movement of the rod 16 in its "intermediate" bearing 100 which will predominate to control the degree of pivotal movement of the foot pedal 1 rather than the fixed pivot 3.

In FIG. 10, the bearing 100 takes the form of a spherical bearing 101 having a linear aperture 102 within which the rod 16 is slidable. The bearing 101 is mounted for pivotal movement in a complementary shaped housing 103 and a part 104 of the post 4, the housing being affixed as at 105 to the top of the hollow post 4.

FIG. 11 (a fragmentary view showing only some of the parts of FIG. 10) differs therefrom only in that the bearing 101 with its aperture 102 and the housing 103 is disposed within and intermediate the ends of the hollow post 4. In a further alternative which is a variation of the pedal operated mechanism shown in FIGS. 6 to 9, the plate 24 is replaced by a pair of plates, the bell crank lever 22 being connected for swinging movement as before to a first one of the plates to which the U-bolt 34 is also secured, and the cable casing being mounted upon the second plate. The two plates are pivotally attached to one another so that the second plate can be angularly swung about a horizontal axis downwardly relative to the first plate in a vertical plane. In particular, the angular adjustment provided is 30°, the result being that the cable can extend either horizontally or at any angle downwardly therefrom up to the 30° maximum. The point at which the plates are pivotally interconnected is coincident with the point 28 at which the cable core is connected to the lever 22, and hence effecting the vertical angular adjustment does not impart a linear movement to the cable core nor affect the 360° horizontal adjustment of the cable in the horizontal plane. The first plate has an arcuate slot struck about the point 28 and extending through 30°, and the second plate is bolted through that slot to the first plate. The bolt can be loosened to permit the second plate to be angularly adjusted and then tightened to retain that plate in its newly adjusted attitude.

In the described forms, a pedal mechanism integrated with a mechanical control cable has been provided having a degree of flexible use previously unknown in the art. As will be appreciated, if wished the control cable and pedal mechanism could be sold separately or as a package.

What we claim is:

1. A pedal operated mechanism comprising a pedal, means for mounting the pedal for pivotal movement about a substantially horizontal axis (considered in one orientation of said mechanism) in a substantially vertical plane, an output means adapted for operative connection to a flexible cable element, connection means operatively connecting the output means and the pedal such that the output means will translate the cable element, when operatively connected thereto, in response to pivotal movement of the pedal, and adjusting means for swivelling the output means relative to the pedal about a substantially swivel axis into any of a plurality of angular positions in a horizontal plane such that the cable element can extend in any path complementary to the angular position in which the output means is adjusted, the connection means maintaining said operative connection between the pedal and the output means in whatever angular position the output means is adjusted.

2. A pedal operated mechanism as claimed in claim 1, wherein said output means comprise a lever and means for mounting said lever for pivotal movement about a substantially horizontal axis in response to pivotal movement of said pedal, and wherein said connection means comprise a rod means and means pivotally connecting opposite ends of said rod means with said pedal and lever respectively, pivotal movement of said lever being effective to translate the cable element when said lever is operatively connected thereto.

3. A pedal operated mechanism as claimed in claim 1, including a hollow post intermediate said pedal and said lever and into which said rod means extends to interconnect said pedal and said lever.

4. A pedal operated mechanism, comprising a pedal, means for mounting the pedal for pivotal movement about a substantially horizontal axis (considered in one orientation of said mechanism) in a substantially vertical plane, a lever adapted for operative connection to a flexible cable element, means for mounting said lever for pivotal movement about a substantially horizontal axis in response to pivotal movement of said pedal, and a rod means and means pivotally connecting opposite ends of said rod means with said pedal and lever respectively, a hollow post intermediate said pedal and said lever and into which said rod means extends to interconnect said pedal and said lever, wherein said hollow post provides an exterior circular bearing surface whose axis is the substantially vertical swivel axis of said lever, and including means engaging said bearing surface and in connection with said lever by which to mount said lever for said swivel adjustment into any of an infinite number of said angular positions about said swivel axis within a predetermined angular range of movement, such that the cable element can extend in any path complementary to the angular position in which the lever is adjusted, the rod means maintaining said operative connection between the pedal and the output means in whatever angular position the lever is adjusted.

5. A pedal operated mechanism as claimed in claim 4, wherein said rod means extends substantially along said substantially vertical swivel axis about which said lever swivels.

6. A pedal operated mechanism as claimed in claim 5, wherein said rod means comprises first and second parts rotatable relative to one another about the longitudinal axis of said rod means, one of said parts making said pivotal connection with the pedal and the other of said parts making said pivotal connection with the lever, angular adjustment of said lever about said substantially vertical swivel axis causing said first and second parts to rotate relative to one another about said rod means longitudinal axis whilst said pedal remains stationary.

7. A pedal operated mechanism as claimed in claim 6, wherein relative rotation between said first and second parts effects linear movement between said parts by which the pivotal attitude of said pedal is adjusted.

8. A pedal operated mechanism as claimed in claim 7, including means releasably locking said first and second parts against relative rotation about the longitudinal axis of said rod means.

9. A pedal operated mechanism as claimed in claim 7, wherein said first and second parts are in screwthreaded engagement with one another.

10. A pedal operated mechanism as claimed in claim 9, wherein one of said parts comprises an end fitting and the other of said parts comprises a rod.

11. A pedal operated mechanism as claimed in claim 10, including a third rod means part comprising a second end fitting in screwthreaded engagement with the opposite end of said rod to that making screwthreaded engagement with said first-mentioned end fitting, said end fittings making said pivotal connection with said pedal and said lever respectively.

12. A pedal operated mechanism as claimed in claim 11, wherein the or each end fitting, as the case may be, is of two pieces capable of pivotal movement relative to one another around an arcuate surface between said pieces in response to pivotal movement of said pedal.

13. A pedal operated mechanism as claimed in claim 4, wherein said hollow post has a peripheral polygonal exterior surface and the longitudinal axis of said post is the substantially vertical swivel axis of said lever, and including means engaging said polygonal post surface and in connection with said lever by which to permit said lever to make said swivel adjustment into any of a plurality of finite positions corresponding to the number of flat faces on said polygonal post surface.

14. A pedal operated mechanism as claimed in claim 4, including a support member to which said lever is mounted for its said pivotal movement, and wherein said means engaging said bearing surface is directly connected to said support member by which said support member is capable of making said swivel adjustment movement and, thereby, cause said lever to perform similarly.

15. A pedal operated mechanism as claimed in claim 14, wherein said lever mounting means comprises U-bolt means embracing said post bearing surface and movable therearound, and means for clamping said U-bolt means to said support member to hold said U-bolt means in a selected angular position about said post bearing surface.

16. A pedal operated mechanism as claimed in claim 4, wherein said pedal is pivotally mounted to said post.

17. A pedal operated mechanism as claimed in claim 4, wherein said post includes an integral mounting collar by which said mechanism is mountable on a support surface of a vehicle for use therewith.

18. A pedal operated mechanism as claimed in claim 4, including means sealingly engaging said rod means and said post to prevent the passage of extraneous matter between said rod means and the hollow interior of said post.

19. A pedal operated mechanism as claimed in claim 4, including encasing means carried by said hollow post and pivotal relative thereto, said rod means slidably extending through said encasing means.

20. A pedal operated mechanism as claimed in claim 19, wherein said encasing means comprises a spherical bearing means.

21. A pedal operated mechanism as claimed in claim 12, wherein said lever has a limb extending within said hollow post, said rod means being pivotally connected within said hollow post to said limb.

22. A pedal operated mechanism as claimed in claim 12, including spring return means for biasing said pedal to its original position upon release of pressure applied thereto to cause said lever to pivot to translate, in use, the cable element.

23. A pedal operated mechanism as claimed in claim 22, wherein said spring return means comprises a tension spring anchored at one end to said lever.

24. A pedal operated mechanism as claimed in claim 22, wherein said spring return means comprises a torsion spring operative upon said lever.

25. A pedal operated mechanism as claimed in the preceding claim 12 and in combination with a flexible cable having a cable element translatable within a casing, the cable element being operatively connected to said output means, and said casing being clamped against linear movement with said cable element.

26. A pedal operated mechanism as claimed in claim 25, including means upon which the cable casing is mounted, said mounting means being swingable through a predetermined angular range of adjustment in a substantially vertical plane relative to said output means and about a point coincident with the point of operative connection of said cable element to said output means, by which said cable can extend in any path complementary to the angular position in which said mounting means is adjusted, and means for retaining said mounting means in any position within its said angular adjustment range.

27. A pedal operated mechanism comprising
a hollow post having first and second longitudinal ends,
a first pin connected to a first end of the post,
a pedal having a depending flange connected to the first pin for pivot hole movement about the first pin,
a rod connected to the pedal and extending through the hollow post,
a plate connected to the second end of the hollow post by means for moving the plate around the post into different angular positions with respect to the post,
a second pin connected to the plate,
a bell crank connected to the second pin, the bell crank having first and second ends, the first end of the bell crank being connected to the rod,
a flexible control cable having a casing and a rod slidable within the casing,
the casing being connected to the plate remote from the second pin and the rod being connected to the second end of the bell crank.

28. In a pedal, rod, and lever mechanism in which the pedal moves the rod to move the lever, which in turn moves a flexible cable element, the improvement comprising a mounting means for mounting the pedal and the lever and adjusting means connected between the mounting means and one of the pedal or lever for adjusting the position of the pedal or lever with respect to the mounting means along an arc centered on the rod, whereby the flexible cable may be routed in any direction from the rod.

29. The pedal operated mechanism of claim 28 wherein the adjusting means further comprises means for holding the lever and means for holding the cable whereby the lever and cable are concurrently oriented with respect to the rod.

30. In a pedal operated mechanism having a pedal, a means for mounting the pedal, a rod, means for attaching the rod to the pedal, a lever, means for mounting the lever, and means for attaching the rod to the lever and means for attaching the lever to a cable output, the improvement comprising the lever mounting means surrounding the rod, and adjusting means connected between the lever and the lever mounting means for adjusting the lever with respect to the mounting means whereby the cable may be positioned in any selected orientation to the rod.

* * * * *